US008314766B2

(12) United States Patent
Chang

(10) Patent No.: US 8,314,766 B2
(45) Date of Patent: Nov. 20, 2012

(54) LIQUID CRYSTAL DISPLAY PANEL

(75) Inventor: Chun-Huan Chang, Taipei County (TW)

(73) Assignee: Au Optronics Corporation, Hsinchu (TW)

( * ) Notice: Subject to any disclaimer, the term of this patent is extended or adjusted under 35 U.S.C. 154(b) by 775 days.

(21) Appl. No.: 12/404,352

(22) Filed: Mar. 16, 2009

(65) Prior Publication Data

US 2010/0156769 A1 Jun. 24, 2010

(30) Foreign Application Priority Data

Dec. 24, 2008 (TW) ............................... 97150529 A

(51) Int. Cl.
*G02F 1/13* (2006.01)
*G02F 1/1345* (2006.01)
*G09G 3/36* (2006.01)

(52) U.S. Cl. .............. 345/99; 345/87; 345/98; 349/139; 349/149; 349/152

(58) Field of Classification Search .................. 349/139, 349/149, 152; 345/87, 98, 99
See application file for complete search history.

(56) References Cited

U.S. PATENT DOCUMENTS

| | | | | |
|---|---|---|---|---|
| 6,104,465 A * | 8/2000 | Na et al. | ........................ | 349/152 |
| 6,300,846 B1 * | 10/2001 | Brunker | ............................ | 333/1 |
| 6,947,022 B2 * | 9/2005 | McCartney | ..................... | 345/99 |
| 2003/0035081 A1 * | 2/2003 | Jung et al. | ...................... | 349/152 |
| 2003/0227078 A1 * | 12/2003 | Chang | ........................... | 257/693 |
| 2005/0007537 A1 | 1/2005 | Chang | | |
| 2005/0018121 A1 | 1/2005 | Jen et al. | | |
| 2006/0232738 A1 * | 10/2006 | Lin et al. | ....................... | 349/149 |

FOREIGN PATENT DOCUMENTS

| | | |
|---|---|---|
| CN | 1512251 | 7/2004 |
| JP | 2000-56724 | 2/2000 |
| TW | 449089 | 8/2001 |
| TW | 569177 | 1/2004 |
| TW | 200504412 | 2/2005 |
| TW | I236184 | 7/2005 |
| TW | 200708810 | 3/2007 |
| TW | 200714959 | 4/2007 |

OTHER PUBLICATIONS

Coombs, Jr.; Printed Circuits Handbook; Third Edition 1988, McGraw-Hill, Inc.; pp. 31.25 to 31.28.*
Coombs, Jr.; Printed Circuits Handbook; Third Edition 1988, McGraw Hill, Inc.; pp. 31.25 to 31.28.*
"1st Office Action of China counterpart application", issued on Mar. 11, 2010, p. 1-p. 3.
"Office Action of Taiwan counterpart application" issued on Aug. 30, 2012, p1-p7, in which the listed references were cited.

* cited by examiner

*Primary Examiner* — Quan-Zhen Wang
*Assistant Examiner* — Michael J Eurice
(74) *Attorney, Agent, or Firm* — Jianq Chyun IP Office

(57) ABSTRACT

A liquid crystal display panel includes a display area, a wiring area, and an external circuit area, wherein the wiring area is between the display area and the external circuit area. The liquid crystal display panel includes many pixel structures, external pads and wiring sets. Each wiring set includes a plurality of upper-layer main wires disposed on one plane and lower-layer main wires disposed on another plane, wherein the two planes are parallel. In addition, each upper-layer main wire corresponds to one lower-layer main wire and the shadow which the upper-layer main wire vertically projects on the surface overlaps a part of the corresponding lower-layer main wire. The light leakage around the display area can be eliminated by proper arrangement of main wiring sets, and therefore the display quality is improved.

5 Claims, 11 Drawing Sheets

LIQUID CRYSTAL DISPLAY PANEL

CROSS-REFERENCE TO RELATED APPLICATION

This application claims the priority benefit of Taiwan application serial no. 97150529, filed on Dec. 24, 2008. The entirety of the above-mentioned patent application is hereby incorporated by reference herein and made a part of specification.

BACKGROUND OF THE INVENTION

1. Field of the Invention

The present invention relates to a liquid crystal display panel, and more particularly to a liquid crystal display panel capable of reducing light leakage around the edge of a display area.

2. Description of Related Art

The rapid development of semiconductor devices and display panels contributes to the quantum leap for a multimedia society. Take the display for an example, a TFT liquid crystal display (TFT-LCD) has become the mainstream product in the display market because of its superior display quality, high compactness, low-power consumption, and free-radiation safety.

FIG. 1 is a schematic drawing of a TFT array substrate of a conventional LCD panel. With reference to FIG. 1, the TFT array substrate 100 of the LCD panel has a display area 102 and a non-display area 103, wherein the display area 102 is an area for displaying frames, and the non-display area 103 is an area where driving chips is disposed thereon for controlling the frames displayed. In the display area 102, the TFT array substrate 100 includes a plurality of pixel structures 110, a plurality of scan lines 112 and a plurality of data lines 114, wherein the pixel structures 110 display pixels of the frames, and the scan lines 112 and the data lines 114 are electrically connected to the corresponding pixel structures 110 for transmitting signals to the pixel structures 110.

In general, there is a plurality of driving chips 113 disposed in the non-display area 103 of the TFT array substrate 100, for transmitting the signals from the corresponding the scan lines 112 or the data lines 114 to the pixel structures 110 through metal wires 130. However, in prior art, by transmitting the signals to the pixel structures 110 through a double layer structure of the metal wires 130, the impedances of the metal wires 130 remain equal, but the double layer structure thereof is so easy to form transparent areas, which light emitted from a backlight can pass through, that light leakage happen, and the products of resistance and capacitance of each metal wires 130 are so much different. This undesirable condition will cause an awkward situation such as band mura, and it will affect the display quality seriously.

SUMMARY OF THE INVENTION

Accordingly, the present invention is related to a liquid crystal display panel provided with wiring sets in proper wiring manner, so as to reduce light leakage around a display area and thereby enhance the display quality.

In order to solve the problems of the prior art, the present invention provides a liquid crystal display panel (LCD panel) has a display area, a wiring area and an external circuit area. The external circuit area is disposed around the display area, and the wiring area is disposed between the display area and the external circuit area. The liquid crystal display panel comprises a plurality of pixel structures, a plurality of external pads, and a plurality of wiring sets. The pixel structures are arranged with an array form in the display area. The external pads are disposed in the external circuit area. The wiring sets are disposed in the wiring area and electrically connected between the corresponding pixel structures and external pads. Each of the wiring sets comprises a plurality of lower-layer main wires located on a first plane and a plurality of upper-layer main wires located on a second plane, wherein the first plane and the second plane are parallel. Each upper-layer main wire is corresponding to one lower-layer main wire, and a vertical projection of the upper-layer main wire on the first plane partially overlaps with the corresponding lower-layer main wire.

According to the LCD panel in an embodiment of the present invention, each upper-layer main wire and the lower-layer main wire corresponding thereto are in the same pattern.

According to the LCD panel in an embodiment of the present invention, each upper-layer main wire is a straight line, and each lower-layer main wire is a straight line.

According to the LCD panel in an embodiment of the present invention, each upper-layer main wire is a successive meander line, and each lower-layer main wire is a successive meander line.

According to the LCD panel in an embodiment of the present invention, each successive meander line comprises a plurality of first line segments, a plurality of second line segments and a plurality of third line segments (FIG. 4B). The third line segments have the same length, parallel to each other, and are equally spaced. The first line segments connect the $(2n-1)^{th}$ third line segment and the $2n^{th}$ third line segment sequentially, and the second line segments connect the $2n^{th}$ third line segment and the $(2n+1)^{th}$ third line segment sequentially, wherein n is a positive integer.

According to the LCD panel in an embodiment of the present invention, a width of each third line segment is equal to the space between the two neighboring third line segments.

According to the LCD panel in an embodiment of the present invention, the vertical projection of each upper-layer main wire on the first plane relatively shifts from its corresponding lower-layer main wire in a distance of the width of one third line segment.

According to the LCD panel in an embodiment of the present invention, the vertical projection of each upper-layer main wire on the first plane relatively shifts from its corresponding lower-layer main wire in a distance larger or smaller than the width of one third line segment.

According to the LCD panel in an embodiment of the present invention, a length of the upper-layer main wire or the lower-layer main wire in each of the wiring sets gradually decreases from a center area of the wiring set to a peripheral area of the wiring set.

According to the LCD panel in an embodiment of the present invention, each of the wiring sets further comprises a plurality of subordinate wires, and a part of the upper-layer main wires and a part of the lower-layer main wires are connected to the corresponding pixel structures through the subordinate wires.

According to the LCD panel in an embodiment of the present invention, a width of the upper-layer main wire and the lower-layer main wire in each of the wiring sets gradually increases from a center area of the wiring set to a peripheral area of the wiring set.

According to the LCD panel in an embodiment of the present invention, the vertical projection of each upper-layer main wire on the first plane and a part of the corresponding lower-layer main wire exposed by the vertical projection are integrated to form an union area, and the union area gradually decreases from a center area of the wiring set to a peripheral area of the wiring set. The union area shown in FIG. 2C is sum of the oblique line area and the exposed area exposed there below.

Since the main wire sets in the wiring area of the LCD panel of the present invention adopt a double-layer structure formed by disposing the upper-layer and lower-layer main wires with an offset, light leakage around the display area is reduced, and the products of resistance and capacitance are less different.

In order to make the features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention is directed to a LCD panel provided with proper wiring structure to form wiring sets in a wiring area. Features and advantages of the technique in the present invention will be illustrated in the following to those skilled in the art.

Figure 1:
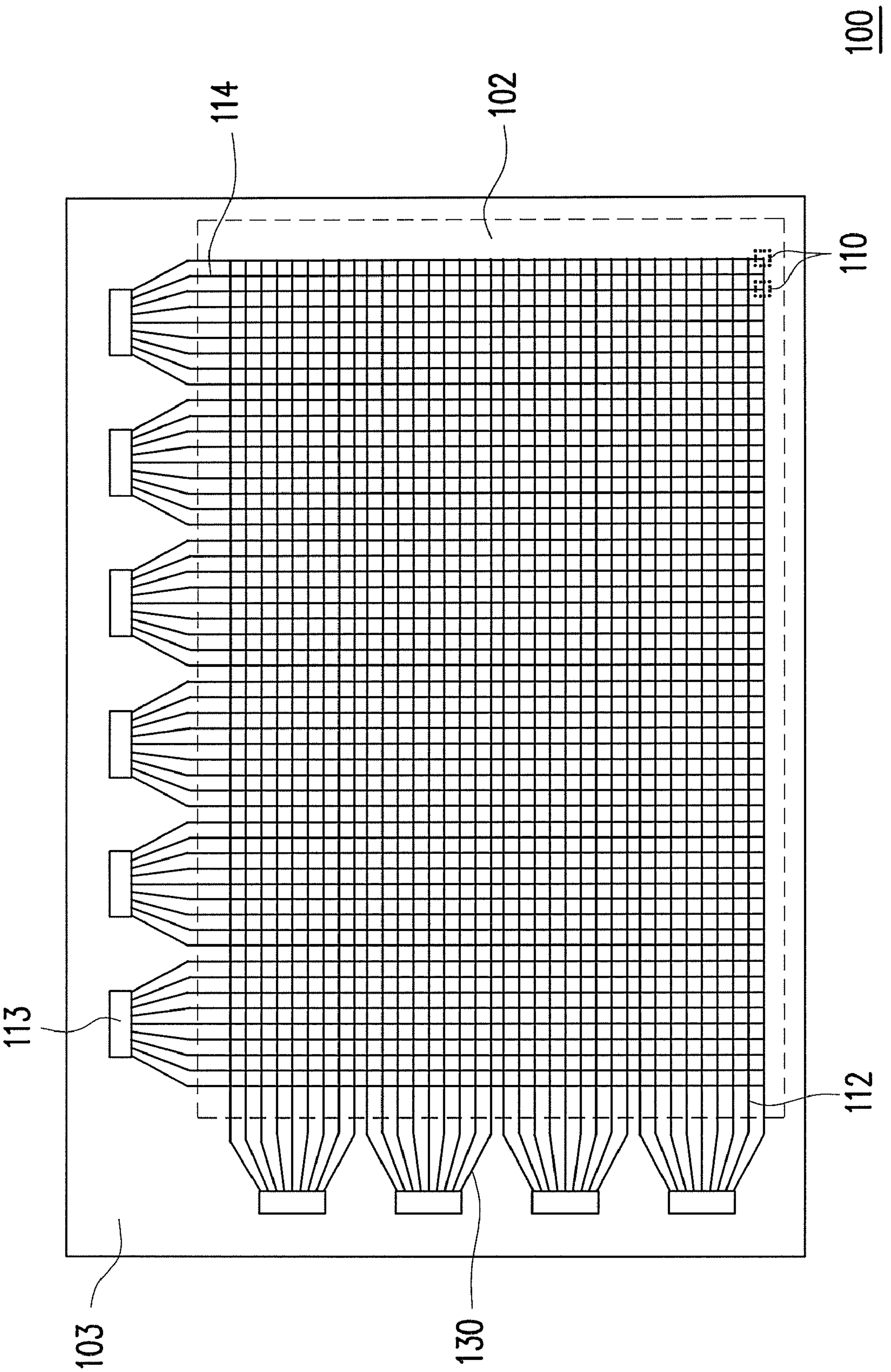
FIG. 1 (PRIOR ART)
FIG. 1 is a schematic drawing of a TFT array substrate of a conventional LCD panel.
Figure 2A:
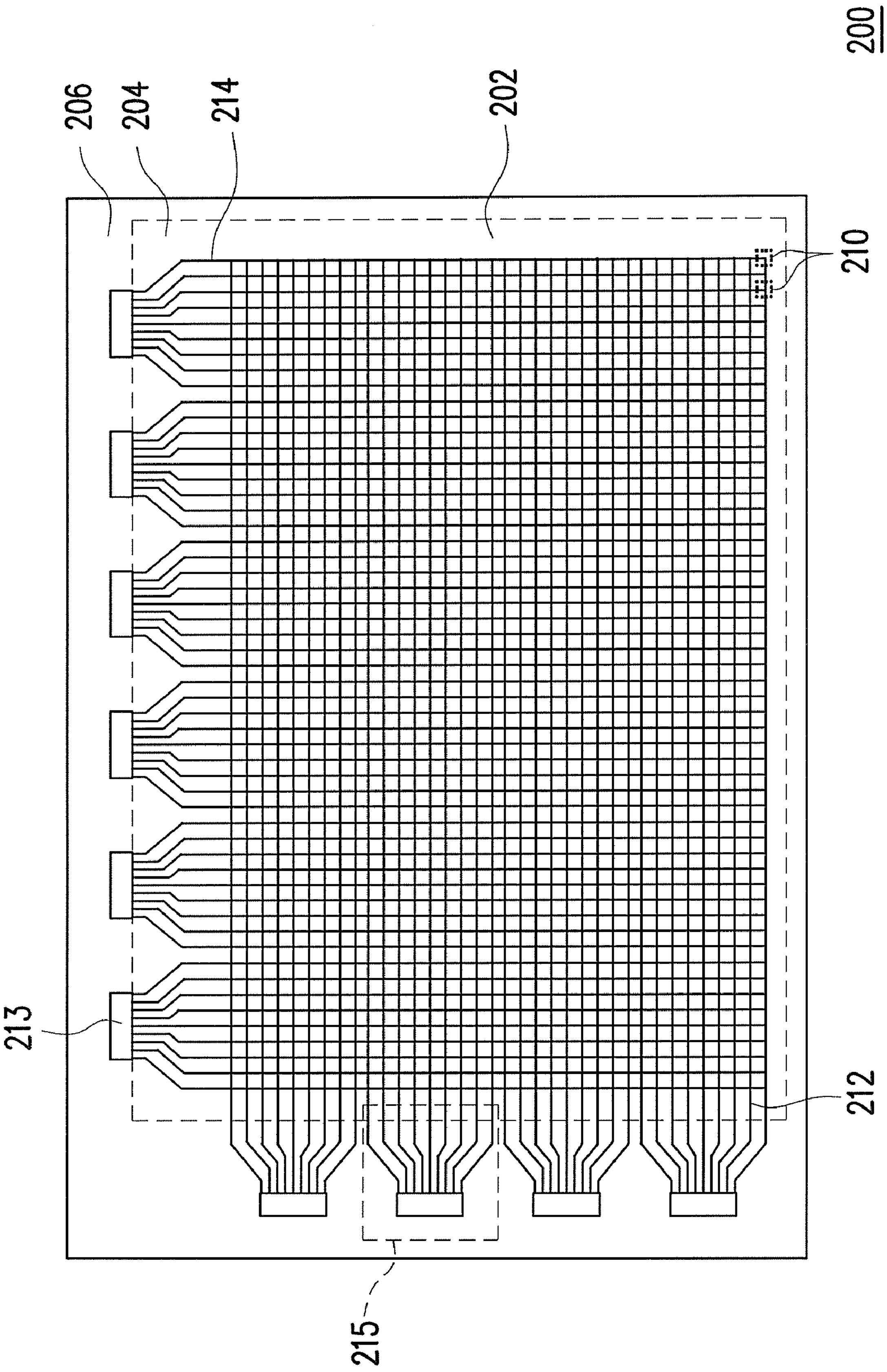
FIG. 2A illustrates a schematic drawing of a TFT array substrate of a LCD panel according to an exemplary embodiment of the present invention.

FIG. 2A illustrates a schematic drawing of a TFT array substrate of a LCD panel according to an exemplary embodiment of the present invention. Referring to FIG. 2A, the TFT array substrate 200 of the LCD panel has a display area 202, a wiring area 204 and an external circuit area 206. The display area 202 is an area for displaying frame image, the external circuit area 206 is disposed around the display area 202, and the external circuit area 206 is an area where driving chips is disposed for controlling display of the frame image. In the display area 202, the TFT array substrate 200 includes a plurality of pixel structures 210, a plurality of scan lines 212 and a plurality of data lines 214. The scan lines 212 and the data lines 214 are electrically connected to the corresponding pixel structures 210 for transmitting signals to the pixel structures 210, and the pixel structures 210 are driven to show the frame image.

Figure 2B:
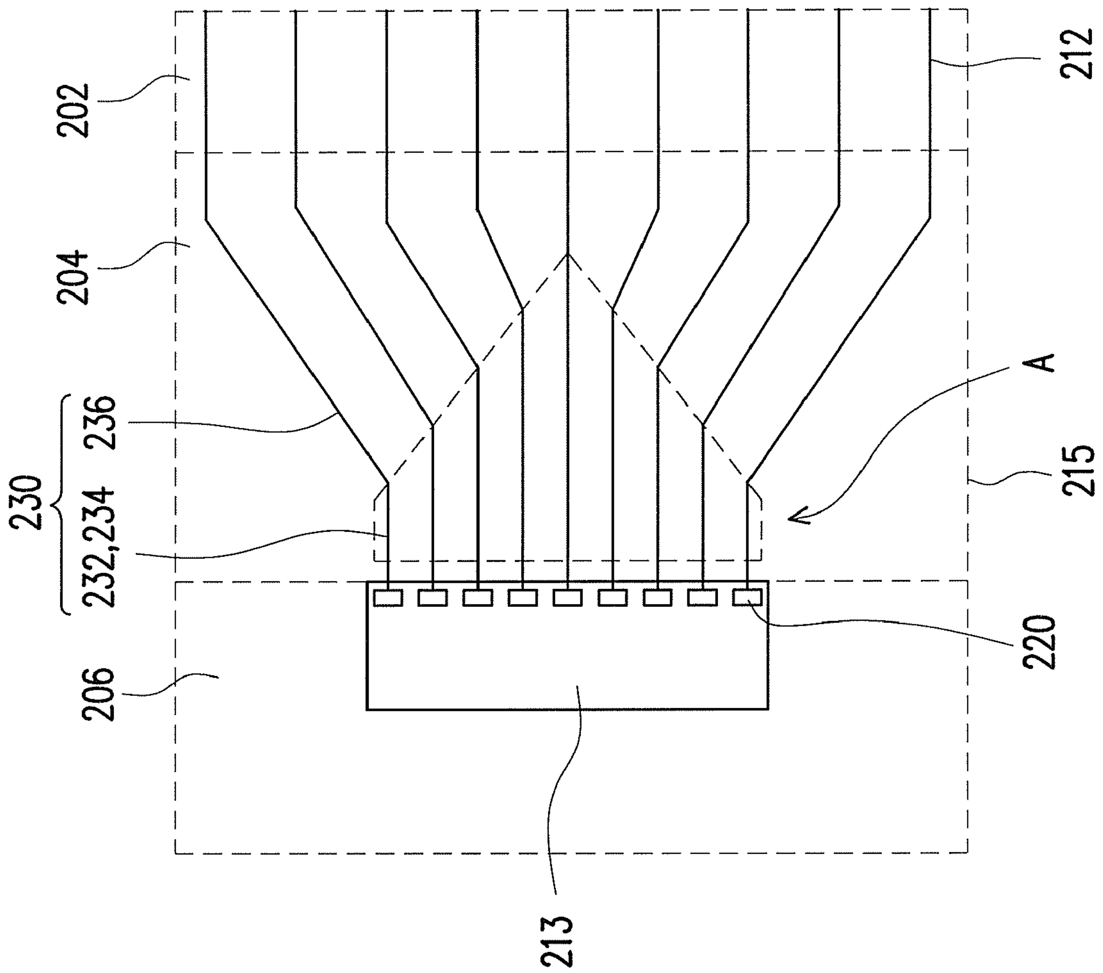
FIG. 2B is an enlarged schematic drawing of a fan-out area of the TFT array substrate.

FIG. 2B is an enlarged schematic drawing of a fan-out area 215 of the TFT array substrate 200. Referring to both FIGS. 2A and 2B, the external circuit area 206 has a plurality of chip-bonding area 213, wherein a plurality of external pads are disposed in the chip-bonding area 213. The wiring area 204 is disposed between the display area 202 and the external circuit area 206. A plurality of wiring sets 230 are disposed in the wiring area 204 and electrically connected between the corresponding pixel structures 210 and external pads 220. Driving chips are disposed in the chip-bonding area 213 to transmit signals from the corresponding scan lines 212 or data lines 214 to the pixel structures 210 through the wiring sets 230 disposed in the wiring area 204.

Figure 2C:
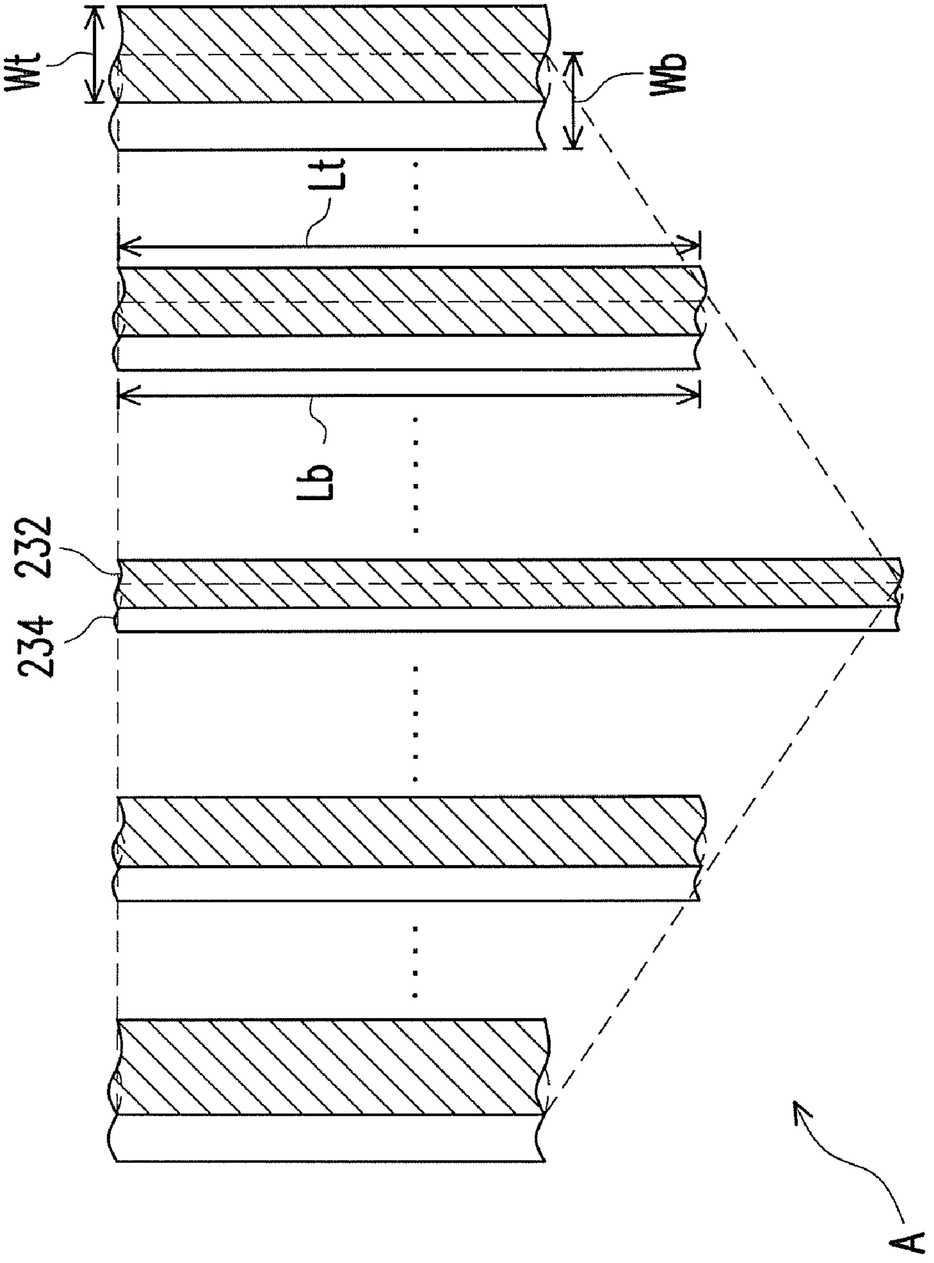
FIG. 2C is a schematic layout of parts of the wiring sets shown in FIG. 2B.

FIG. 2C is a schematic layout of a part of the wiring sets shown in FIG. 2B. Referring to both FIGS. 2B and 2C, each of the wiring sets 230 include a plurality of lower-layer main wires 234 located on a lower plane and a plurality of upper-layer main wires 232 located on an upper plane, wherein the upper plane and the lower plane are parallel. FIG. 2C only illustrates a schematic layout of the main wires 232 and 234 in an area A circled by a dotted line in the wiring sets 230 shown in FIG. 2B. Each of the upper-layer main wires 232 is corresponding to one lower-layer main wire 234, and a vertical projection of the upper-layer main wire 232 on the lower plane partially overlaps with the corresponding lower-layer main wire 234. In addition, each of the wiring sets 230 further includes a plurality of subordinate wires 236, wherein a part of the upper-layer main wires 232 and a part of the lower-layer main wires 234 are connected to the corresponding pixel structures 210 through the subordinate wires 236.

In this embodiment, each of the upper-layer main wire 232 is corresponding to one lower-layer main wire 234. The upper-layer main wires 232 and the corresponding lower-layer main wires 234, for example, have the same pattern. The pattern of the main wires 232 and 234 in this embodiment is a straight line illustrated as an example, but not limited to the present invention. That is, each set of the corresponding main wires 232 and 234 is not limited to the straight line. In this embodiment, a length Lt of the upper-layer main wire 232 or a length Lb of the lower-layer main wire 234 in each of the main wire sets gradually decreases from a center area of the wiring sets 230 to a peripheral area of the wiring set 230, while widths Wt and Wb of the main wires 232 and 234 respectively gradually increase from the center area to the peripheral area. Accordingly, through the aforementioned layout of the main wires 232 and 234, impedance of each main wire 232 or 234 can be maintained in equal, and variations of the product of resistance and capacitance from the center area to the peripheral area can be reduced.

Figure 2D:
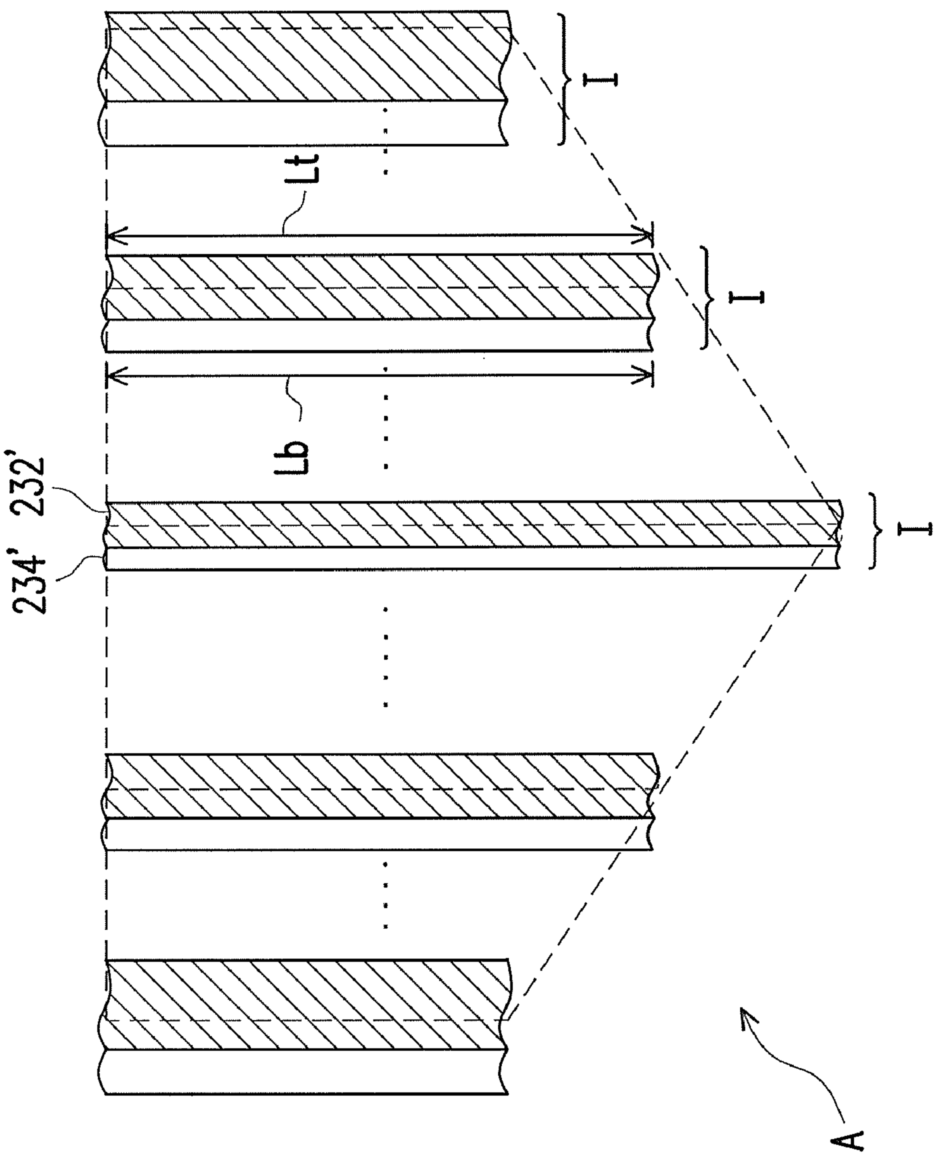
FIG. 2D is a schematic layout of parts of the wiring sets shown in FIG. 2B according to another embodiment of the present invention.

FIG. 2D is a schematic layout of a part of the wiring sets shown in FIG. 2B according to another embodiment of the present invention. Referring to both FIGS. 2B and 2D, the main wires 232' and 234' of the present embodiment are similar to the main wires 232 and 234 illustrated in the above embodiment except that the length Lt of the upper-layer main wire 232' or the length Lb of the lower-layer main wire 234' in each of the main wire sets 230 gradually decreases from the center area to the peripheral area, and the widths Wt and Wb of the main wires 232' and 234' are maintained equal. Furthermore, a union area I of the main wires 232' and 234' (e.g., sum of the area of the upper-layer main wire 232' and the exposed area of the lower-layer main wire 234') gradually decreases from the center area to the peripheral area.

The profiles of the fan-out area and the wiring sets and the combinations of the wiring sets may further be modified or varied in the scope of the invention. The example shown in FIG. 2C and FIG. 2D are only used for illustration to one skilled in the art to implement the present invention, rather than limiting the scope of the present invention.

Figure 3:
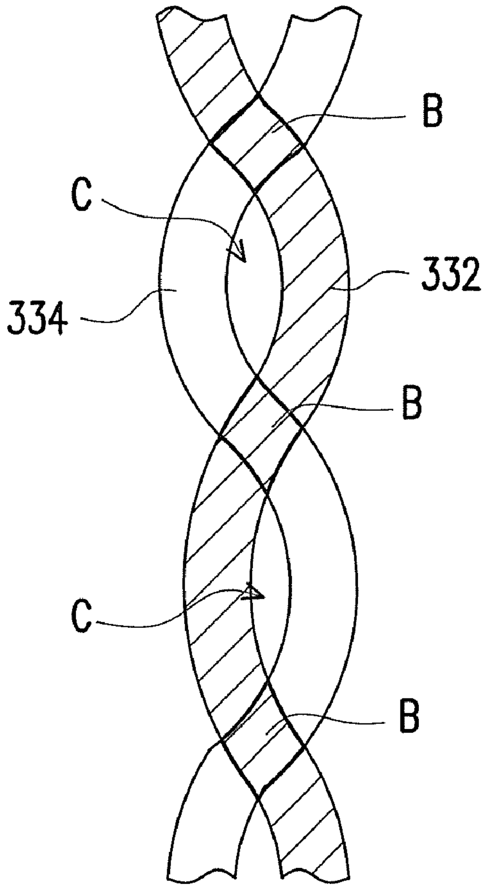
FIG. 3 is a schematic layout of the main wire sets according to another embodiment of the present invention.

FIG. 3 is a schematic layout of the main wire sets according to another embodiment of the present invention, wherein FIG. 3 only illustrates a main wire set as an example. With reference to FIG. 3, the main wires 332 and 334 of the present embodiment are similar to the main wires 232 and 234 illustrated in the above embodiment except that each upper-layer main wire 332 and its corresponding lower-layer main wire 334 are respectively taken in a shape of successively curved "S"-pattern and are interlaced to each other. A vertical projection of the upper-layer main wire 332 on the lower plane partially overlaps with the corresponding lower-layer main wire 334 in an area B of FIG. 3.

Similarly, in order to maintain the same impedance and reduce variations of the product of resistance and capacitance from the center of the fan-out area to the periphery of the fan-out area, one can adjust the length, the width and the union area of each main wire set. Additionally, the size of holes C can further be adjusted by modifying the length, the width and the union area of each main wire set to eliminate light leakage around the display area.

Figure 4A:
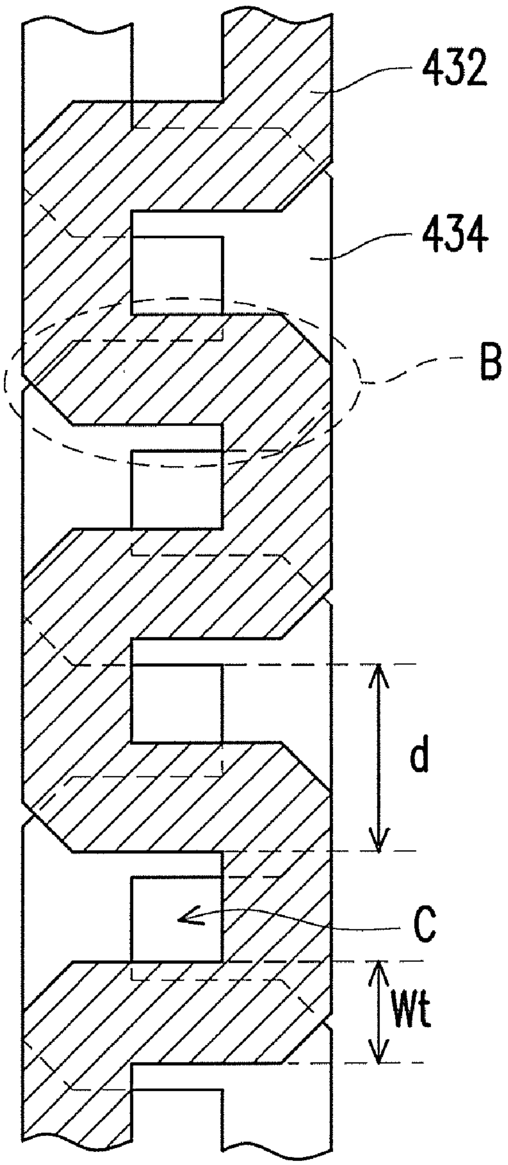
FIG. 4A is a schematic layout of the main wire sets according to another embodiment of the present invention.

FIG. 4A is a schematic layout of the main wire sets according to another embodiment of the present invention, wherein FIG. 4A only illustrates a main wire set as an example. With reference to FIG. 4A, the main wires 432 and 434 of the present embodiment are similar to the main wires 232 and 234 illustrated in the above embodiment except that the patterns of the main wires 432 and 434 are the successive meander lines in the same pattern.

Figure 4B:
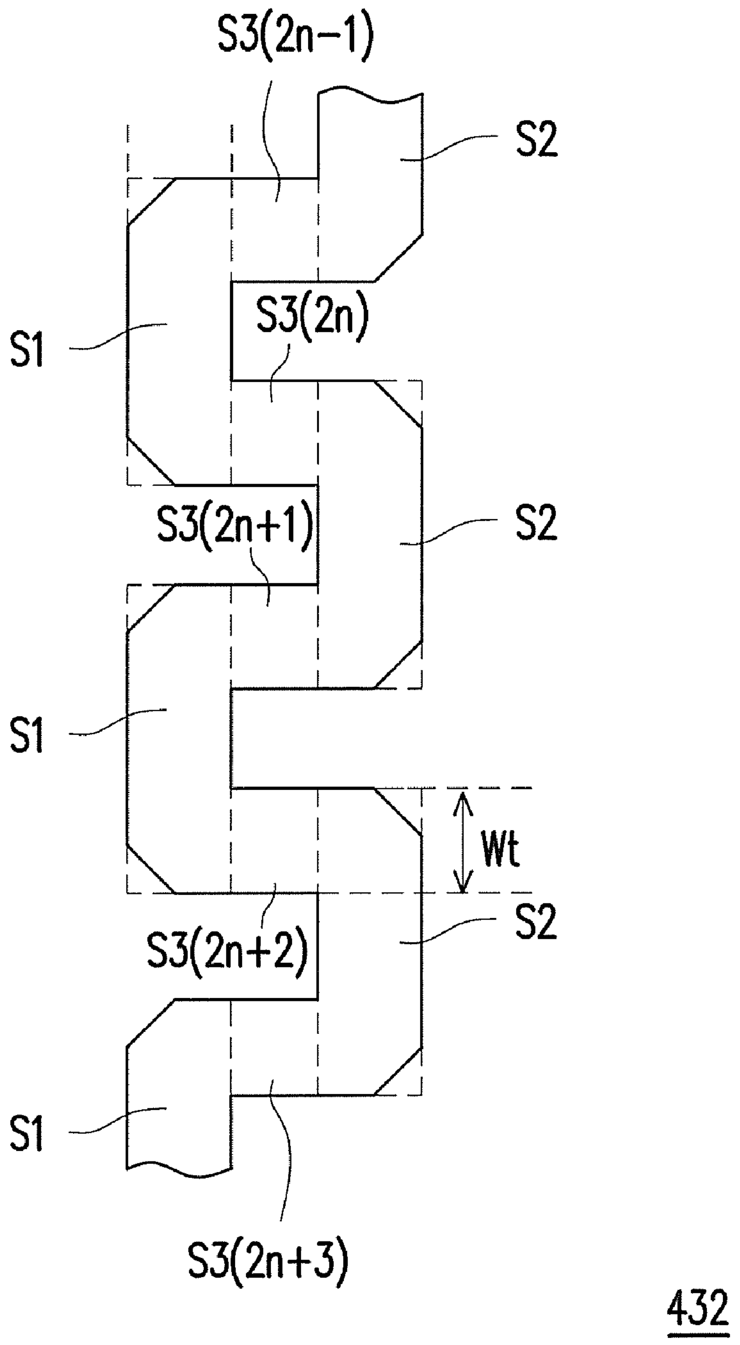
FIG. 4B is a layout of the upper-layer main wire shown in FIG. 4A.

FIG. 4B is a layout of the upper-layer main wire shown in FIG. 4A. Referring to FIG. 4B, taking the upper-layer main wire 432 as an example, each successive meander line includes a plurality of line segments S1, S2 and S3. The line segments S3 have the same length, parallel to each other, and are equally spaced. Each of the line segments S1 respectively connects the (2n−1)th line segment S3 and the $2n^{th}$ line segment S3, the $(2n+1)^{th}$ line segment S3 and the $(2n+2)^{th}$ line segment S3, and so on, wherein n is a positive integer. Similarly, each of the line segments S2 respectively connects the $2n^{th}$ line segment S3 and the $(2n+1)^{th}$ line segment S3, the $(2n+2)^{th}$ line segment S3 and the $(2n+3)^{th}$ line segment S3, and so on, wherein n is a positive integer. That is, the $even^{th}$ line segment S3 (e.g. 2n and 2n+2) connect the upper terminal of the line segments S2 and the lower terminal of the line segments S1, and relatively, the $odd^{th}$ line segment S3 (e.g. 2n−1, 2n+1, and 2n+3) connect the upper terminal of the line segments S1 and the lower terminal of the line segments S2. In this embodiment, the width Wt of each line segment S3 is equal to that of the line segments S1 and S2.

As know from FIG. 4A, the upper-layer main wire 432 is shifted an offset "d" relatively to the corresponding lower-layer main wire 434, wherein the offset "d" is larger than the width Wt of the line segments S3. In other embodiments, the offset "d" may be equal to or smaller than the width Wt of the line segments S3. Accordingly, the overlapping area B formed by a vertically projected area of the upper-layer main wire 432 on the lower plane and the corresponding lower-layer main wire 434 varies according to the offset "d".

Figure 4C:
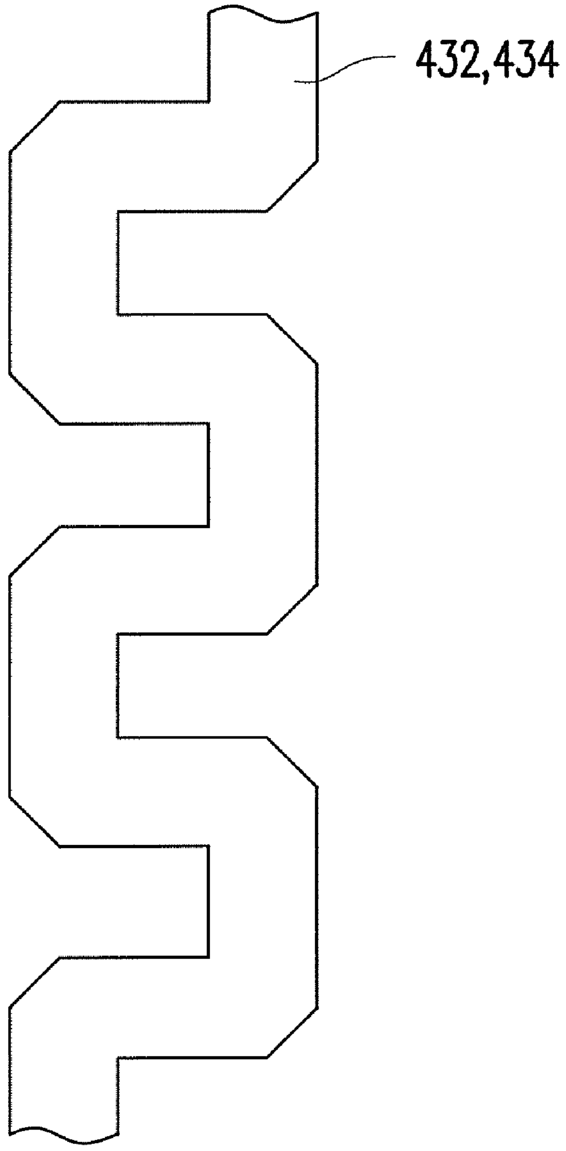
FIGS. 4C and 4D are schematic layouts of the main wire sets shown in FIG. 4A with the different offsets.
Figure 4D:
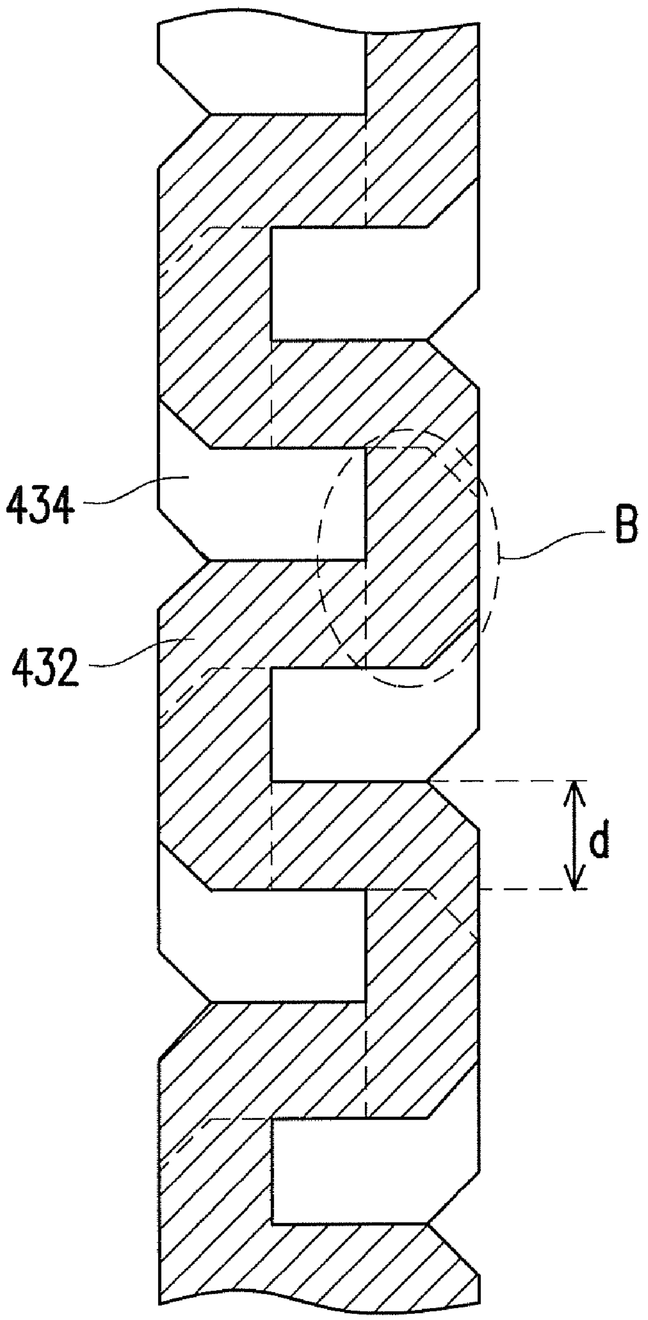
Figure 5A:
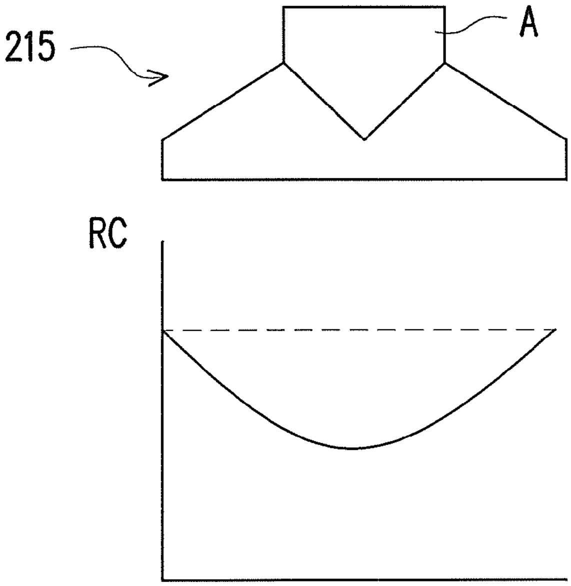
FIGS. 5A and 5B respectively illustrate the product distribution of resistance and capacitance in each fan-out area of the LCD panel with the main wire sets shown in FIGS. 4C and 4D.
Figure 5B:
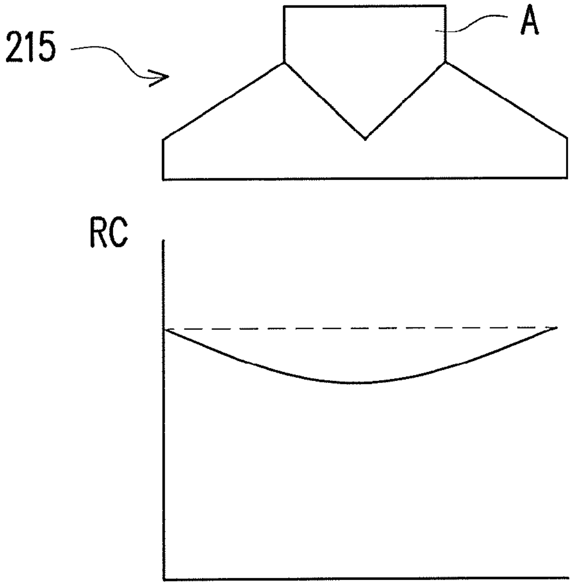

FIGS. 4C and 4D are schematic layouts of the main wire sets shown in FIG. 4A with the different offsets, wherein FIGS. 4C and 4D only illustrate a main wire set as an example, respectively. FIGS. 5A and 5B respectively illustrate the product distribution of resistance and capacitance in each fan-out area 215 of the LCD panel with the main wire sets shown in FIGS. 4C and 4D. Please referring to FIGS. 4C, 4D, 5A and 5B.

Referring to FIG. 4C, the offset of the upper-layer main wire 432 and the lower-layer main wire 434 is zero. That is, the vertical projection of the upper-layer main wire 432 on the lower plane coincides with the corresponding lower-layer main wire 434 to form a successive zigzag-like pattern. However, although the double-layer structure of the metal wires in successive zigzag-like pattern maintains equal impedance, the product of resistance and capacitance of wires in the fan-out area 215 is not uniform. Specifically, shown in FIG. 5A, the product RC of resistance and capacitance gradually increases from a center area of the wiring set to a peripheral area of the wiring set and forms an excessive drop in RC value between the center area and the peripheral area of the wiring set in the fan-out area 215.

As shown in FIG. 4D, another embodiment of the present invention is presented, wherein the upper-layer main wire 432 shifts from the lower-layer main wire 434 in an offset "d" equal to the width of the line segments S3. The layout of the main wire sets not only maintains the impedance thereof in equal, but also increases the product RC of resistance and capacitance of each wiring set to reduce the drop in RC value between the center area and the peripheral area of the wiring set in the fan-out area 215, which is shown in FIG. 5B. In addition, since the offset "d" is equal to the width of the line segments S3, the layout of the main wire set in the embodiment forms no hole as shown in FIG. 4A, and therefore the light leakage cause by the backlight in the periphery of display region can be eliminated.

In summary, the above embodiments according to the prevent invention provides a LCD panel, which adopts a suitable structure to form the wiring sets. In some embodiments, by means of various forms of the main wire sets and different combinations of the main wire sets, the drop of the product of resistance and capacitance from a center area of the wiring set to a peripheral area of the wiring set is reduced, and the displaying quality is thereby improved. Furthermore, the light leakage cause by the backlight in the periphery of display region can be eliminated by is modifying the pattern of the main wire set and the offset there between.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel, having a display area, a wiring area and an external circuit area, the external circuit area disposed around the display area, and the wiring area disposed between the display area and the external circuit area, the liquid crystal display panel comprising:

a plurality of pixel structures, arranged with an array form in the display area;

a plurality of external pads, disposed in the external circuit area; and a plurality of wiring sets, disposed in the wiring area, and electrically connected between the corresponding pixel structures and external pads, each of the wiring sets comprising a plurality of lower-layer main wires located on a first plane and a plurality of upper-layer main wires located on a second plane, wherein the first plane and the second plane are parallel, each upper-layer main wire is corresponding to one lower-layer main wire, and a vertical projection of the upper-layer main wire on the first plane partially overlaps with the corresponding lower-layer main wire, wherein each of the upper-layer main wires and the lower-layer main wire corresponding thereto are in the same pattern, each of the upper-layer main wires or each of the lower-layer main wires is a successive meander line, each successive meander line comprises a plurality of first line segments, a plurality of second line segments and a plurality of third line segments, the third line segments have the same length, parallel to each other, and are equally spaced, the first line segments connect the $(2n-1)^{th}$ third line segment and the $2n^{th}$ third line segment sequentially, the second line segments connect the $2n^{th}$ third line segment and the $(2n+1)^{th}$ third line segment sequentially, wherein n is a positive integer, a width of each third line segment is equal to the space between the two neighboring third line segments, and the vertical projection of each upper-layer main wire on the first plane shifts from its corresponding lower-layer main wire in a distance of the width of one third line segment.

2. The liquid crystal display panel as claimed in claim 1, wherein a length of the upper-layer main wire or the lower-layer main wire in each of the wiring sets gradually decreases from a center area of the wiring set to a peripheral area of the wiring set.

3. The liquid crystal display panel as claimed in claim 2, wherein each of the wiring sets further comprises a plurality of subordinate wires, and a part of the upper-layer main wires and a part of the lower-layer main wires are connected to the corresponding pixel structures through the subordinate wires.

4. The liquid crystal display panel as claimed in claim 1, wherein a width of the upper-layer main wire and the lower-layer main wire in each of the wiring sets gradually increases from a center area of the wiring set to a peripheral area of the wiring set.

5. A liquid crystal display panel, having a display area, a wiring area and an external circuit area, the external circuit area disposed around the display area, and the wiring area disposed between the display area and the external circuit area, the liquid crystal display panel comprising:

a plurality of pixel structures, arranged with an array form in the display area;

a plurality of external pads, disposed in the external circuit area; and a plurality of wiring sets, disposed in the wiring area, and electrically connected between the corresponding pixel structures and external pads, each of the wiring sets comprising a plurality of lower-layer main wires located on a first plane and a plurality of upper-layer main wires located on a second plane, wherein the first plane and the second plane are parallel, each upper-layer main wire is corresponding to one lower-layer main wire, and a vertical projection of the upper-layer main wire on the first plane partially overlaps with the corresponding lower-layer main wire, wherein the vertical projection of each upper-layer main wire on the first plane and a part of the corresponding lower-layer main wire exposed by the vertical projection are integrated to form an union area, and the union area gradually decreases from a center area of the wiring set to a peripheral area of the wiring set.

* * * * *